(12) United States Patent
De Mattia et al.

(10) Patent No.: US 10,688,610 B2
(45) Date of Patent: Jun. 23, 2020

(54) EFFECTOR COMPRISING A CONTACT SURFACE HAVING AN INTERFACE MADE OF A DUCTILE MATERIAL

(71) Applicant: Airbus Operations S.A.S., Toulouse (FR)

(72) Inventors: Denis De Mattia, Basse Goulaine (FR); Gilles Batard, Rouans (FR); Sebastian Gohier, Saint Jean de Boiseau (FR); Sébastien Quillaud, Viais (FR)

(73) Assignee: Airbus Operations S.A.S. (FR)

( * ) Notice: Subject to any disclaimer, the term of this patent is extended or adjusted under 35 U.S.C. 154(b) by 261 days.

(21) Appl. No.: 15/645,098

(22) Filed: Jul. 10, 2017

(65) Prior Publication Data

US 2018/0021902 A1    Jan. 25, 2018

(30) Foreign Application Priority Data

Jul. 25, 2016    (FR) ..................... 16 57091

(51) Int. Cl.
*B23Q 3/16*    (2006.01)
*B25J 15/00*    (2006.01)

(52) U.S. Cl.
CPC ............ *B23Q 3/16* (2013.01); *B25J 15/0019* (2013.01); *B25J 15/0095* (2013.01); *Y10S 901/41* (2013.01)

(58) Field of Classification Search
CPC ...... Y10S 901/41; B23Q 3/16; B25J 15/0019; B25J 9/046; B25B 11/00; B25H 1/0078; B25C 7/00; B25C 1/188
USPC .......................................................... 901/30
See application file for complete search history.

(56) References Cited

U.S. PATENT DOCUMENTS

| 4,037,982 A | * | 7/1977 | Clement | B23Q 11/006 408/61 |
| 4,523,100 A |  | 6/1985 | Payne |  |
| 4,690,436 A | * | 9/1987 | Hehl | F16L 15/008 285/321 |
| 4,741,199 A | * | 5/1988 | Spencer | F16J 15/004 277/320 |
| 4,836,357 A | * | 6/1989 | Focke | B65G 47/268 198/779 |
| 5,096,342 A | * | 3/1992 | Blankenship | B23B 49/008 408/112 |
| 5,332,343 A | * | 7/1994 | Watanabe | B23Q 3/002 408/56 |

(Continued)

FOREIGN PATENT DOCUMENTS

DE    10 2010 008998 A1    8/2011
FR        3 030 338 A1    6/2016

OTHER PUBLICATIONS

MIT, Material (Year: 2007).*
FR 16 57091 Search Report (dated Apr. 3, 2017) (p. 1 categorizing the cited references).

*Primary Examiner* — Hemant Desai
*Assistant Examiner* — Christopher Robin Kim
(74) *Attorney, Agent, or Firm* — Lerner, David, Littenberg, Krumholz & Mentlik, LLP

(57) ABSTRACT

An effector includes at least one contact surface configured to bear against a face of a workpiece near a zone of the workpiece that is impacted by a tool supported by the effector. The contact surface includes at least one interface made of a ductile material interposed between the contact surface and the face of the workpiece.

5 Claims, 1 Drawing Sheet

(56) References Cited

U.S. PATENT DOCUMENTS

| | | | | |
|---|---|---|---|---|
| 5,771,936 A * | 6/1998 | Sasaki | F15B 1/103 | 138/30 |
| 6,067,698 A * | 5/2000 | Silvera-Langley | A47G 19/08 | 220/573.3 |
| 7,299,961 B2 * | 11/2007 | Stavig, Jr. | B21J 15/02 | 227/107 |
| 7,513,404 B2 * | 4/2009 | Shkolnikov | B25C 1/008 | 227/130 |
| 2005/0271455 A1 * | 12/2005 | Brooks | B43K 23/001 | 401/131 |
| 2006/0043145 A1 * | 3/2006 | Liao | B25C 1/008 | 227/142 |
| 2006/0117547 A1 | 6/2006 | Ftield et al. | | |
| 2009/0266867 A1 * | 10/2009 | Mina | B25C 7/00 | 227/151 |
| 2011/0073630 A1 * | 3/2011 | Kakuda | B25C 1/008 | 227/8 |
| 2011/0297728 A1 * | 12/2011 | Liang | B25C 7/00 | 227/142 |
| 2012/0145764 A1 * | 6/2012 | Fiorini | B25C 7/00 | 227/147 |
| 2013/0183171 A1 * | 7/2013 | Hwang | F01C 21/0809 | 417/356 |
| 2014/0158739 A1 * | 6/2014 | Grazioli | B25H 1/0021 | 227/129 |
| 2015/0173515 A1 * | 6/2015 | Freedman | A47C 7/024 | 297/314 |
| 2015/0306754 A1 * | 10/2015 | Pappin | B25C 1/04 | 227/15 |
| 2016/0082557 A1 * | 3/2016 | Friz | B25B 13/06 | 29/525.02 |
| 2016/0354919 A1 * | 12/2016 | Fiala | B25H 1/0078 | |
| 2018/0021902 A1 * | 1/2018 | De Mattia | B25J 15/0019 | 173/31 |
| 2018/0099400 A1 * | 4/2018 | Wong | B25C 1/188 | |

* cited by examiner

EFFECTOR COMPRISING A CONTACT SURFACE HAVING AN INTERFACE MADE OF A DUCTILE MATERIAL

FIELD OF THE INVENTION

The present application relates to an effector comprising a contact surface having an interface made of a ductile material.

BACKGROUND OF THE INVENTION

An effector is a tool holder fixed to the end of a robot arm and which supports at least one tool configured to perform an operation on a workpiece, such as, for example, a machine tool.

As the robot does not have a rigid structure, according to one embodiment, the effector comprises a contact surface configured to bear against the workpiece near the tool.

In order to guarantee good machining quality, it is necessary to guarantee good rigidity between the contact surface of the effector and the workpiece that is to be machined. In addition, during machining, the contact surface of the effector must not move relative to the workpiece that is to be machined. If it does, and if the machine tool slips on the surface of the workpiece that is to be machined, it generates unacceptable machining marks. Finally, the contact surface must not damage the workpiece that is to be machined.

According to a first alternative form, the contact surface made of steel is smooth, hard, and has a shape configured to conform to the shapes of the workpiece that is to be machined. According to this first alternative form, the contact pressures are spread over the entire contact surface area, and this avoids marking the workpiece with an imprint. In addition, it guarantees good relative rigidity between the contact surface of the effector and the workpiece that is to be machined. However, this first alternative form is not entirely satisfactory because the contact surface of the effector has a low adhesion coefficient of the order of 0.2. Thus, the risks of the contact surface of the effector slipping on the workpiece that is to be machined are not negligible.

In order to avoid the tool slipping with respect to the workpiece that is to be machined, one solution is to degrade the cutting conditions in order to reduce the loads liable to cause slippage. However, this solution is not satisfactory because it reduces productivity.

According to a second alternative form, the contact surface is coated with fine very hard particles in order to increase the roughness of the contact surface and the coefficient of adhesion between the contact surface of the effector and the workpiece that is to be machined. As before, this second alternative form makes it possible to guarantee good relative rigidity between the contact surface of the effector and the workpiece that is to be machined. However, it is not entirely satisfactory because it is not possible to ensure that the slight penetration of the fine particles of the contact surface of the effector will not impair the workpiece that is to be machined.

According to a third alternative form, the contact surface comprises an elastomer coating in order to increase the adhesion coefficient. This third alternative form makes it possible to ensure a good adhesion coefficient, while at the same time guaranteeing the integrity of the workpiece that is to be machined. However, it is not entirely satisfactory because if the elastomer coating has a small thickness of the order of 0.01 mm, the risks of separation of the coating are high because of the shear stresses, and if the elastomer coating has a thickness greater than 0.01 mm it does not provide rigid contact between the contact surface of the effector and the workpiece that is to be machined because of its thickness combined with the softness of the material.

BRIEF SUMMARY OF THE INVENTION

The present invention seeks to overcome the disadvantages of the prior art.

To this end, the subject of the invention is an effector supporting at least one tool configured to perform an operation on a workpiece and comprising at least one contact surface configured to bear against a face of the workpiece near a zone of the workpiece that is impacted by the tool, said contact surface comprising at least one interface interposed between said contact surface and the face of the workpiece, wherein the interface is made of a ductile material.

The ductile material affords good rigidity between the contact surface of the effector and the workpiece because the elastic modulus of the ductile material is markedly higher than that of elastomers. It also confers an adhesion coefficient that is markedly higher than that of a smooth contact surface, said adhesion coefficient limiting the risk of slippage of the tool on the face of the workpiece. Finally, it does not impair the integrity of the workpiece.

According to another feature, the material of the interface has an elastic modulus higher than 5 GPa.

According to another feature, the contact surface comprises at least one recess configured to partially house at least one interface.

According to another point, the interface has a volume greater than the volume of the recess configured to house said interface.

According to one configuration, the recess is a groove of V-shaped cross section. According to one embodiment, the groove has a profile shaped in an arc of a circle centered with respect to the axis of the tool. To complement this, the interface is a wire of circular cross section.

According to another configuration, the recess has a circular cross section in a plane perpendicular to the axis of the tool. To complement this, the interface is a ball.

BRIEF DESCRIPTION OF THE DRAWINGS

Other features and advantages will become apparent from the following description of the invention, which description is given by way of example only, with reference to the attached drawings in which.

DETAILED DESCRIPTION

Figure 1:
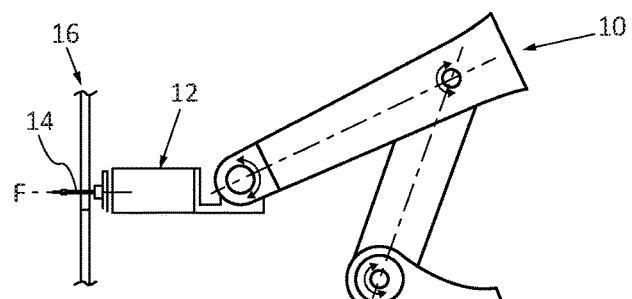
FIG. 1 is a diagram of a robot arm equipped with an effector configured to machine a workpiece.
Figure 2:
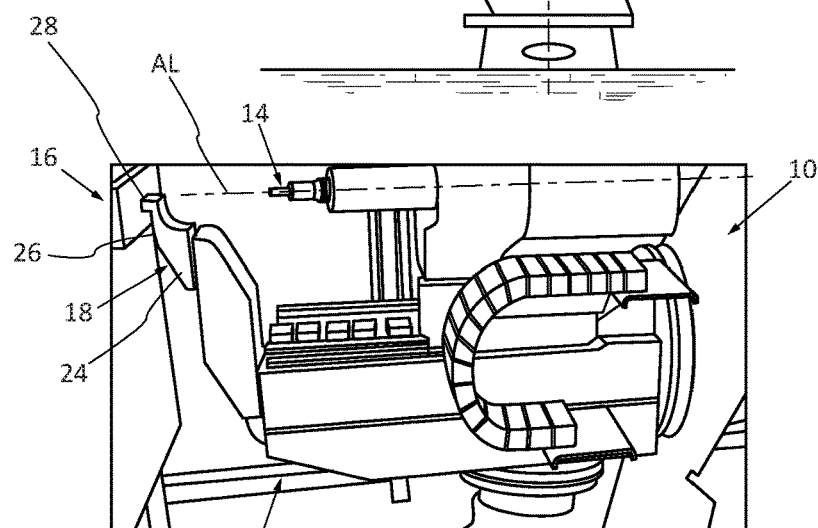
FIG. 2 is a perspective view of an effector equipped with a support leg configured to be in contact with a workpiece that is to be machined.

FIGS. 1 and 2 depict a robot arm 10 equipped with an effector 12. This effector 12 supports at least one tool 14 configured to perform an operation on a region of a workpiece 16.

By way of example, the tool 14 is a drill bit configured to make a drilling in the workpiece 16 which may, for example, be an aircraft fuselage panel.

The effector 12 comprises a support leg 18 which comprises at least one contact surface 20 configured to bear against a face 22 of the workpiece 16 near the zone impacted by the tool.

For the remainder of the description, the longitudinal axis AL is an axis coincident with the normal to face 22 of the workpiece 16 at the point of contact between the tool 14 and the workpiece 16. A longitudinal plane is a plane containing the longitudinal axis AL. A transverse plane is a plane perpendicular to the longitudinal axis AL.

In operation, in the case of a drilling tool, the tool 14 has a cutting movement which corresponds to a rotational movement about an axis of rotation coinciding with the longitudinal axis and an advance movement which corresponds to a translational movement along the longitudinal axis. The invention is not restricted to these cutting and advance movements.

According to one embodiment, the support leg 18 comprises a body 24 connected to the effector 12, an extension 26 and a head 28. This head 28 has a tubular shape, with an axis coinciding with the longitudinal axis AL in operation and an end face of which constitutes the contact surface 20. Of course, the invention is not restricted to this embodiment for the support leg 18.

According to one configuration, the face 22 of the workpiece 16 and the contact surface 20 are planar. In general, the contact surface 20 is configured to conform to the shapes of the face 22 of the workpiece 16.

According to one feature of the invention, the contact surface 20 comprises at least one interface 30 made of a ductile material.

What is meant by a ductile material is a material that simultaneously possesses each of the following features:

an elastic modulus much greater than that of elastomers, namely greater than 5 GPa;

a small elastic domain (far smaller than that of the material of the workpiece with which it is in contact) characterized by a low elastic limit of the order of 100 MPa, a large plastic domain, characterizing its ability to deform plastically without rupturing (elongation at break greater than 30%).

According to one embodiment, the ductile interface 30 is made of tin, lead or any other similar material.

In order to obtain good rigidity, the material of the interface 30 has an elastic modulus higher than 5 GPa.

According to another feature, the contact surface 20 comprises at least one recess 32 configured to partially house at least one interface 30.

The volume of the interface 30 is greater than the volume of the recess 32. Thus, when the contact surface 20 is pressed firmly against the face 22 of the workpiece 16, the material of the interface 30 conforms to the shapes of the recess 32 and creeps out of the recess 32 between the contact surface 20 and the face 22 of the workpiece 16.

Figures 3, 4, 5:
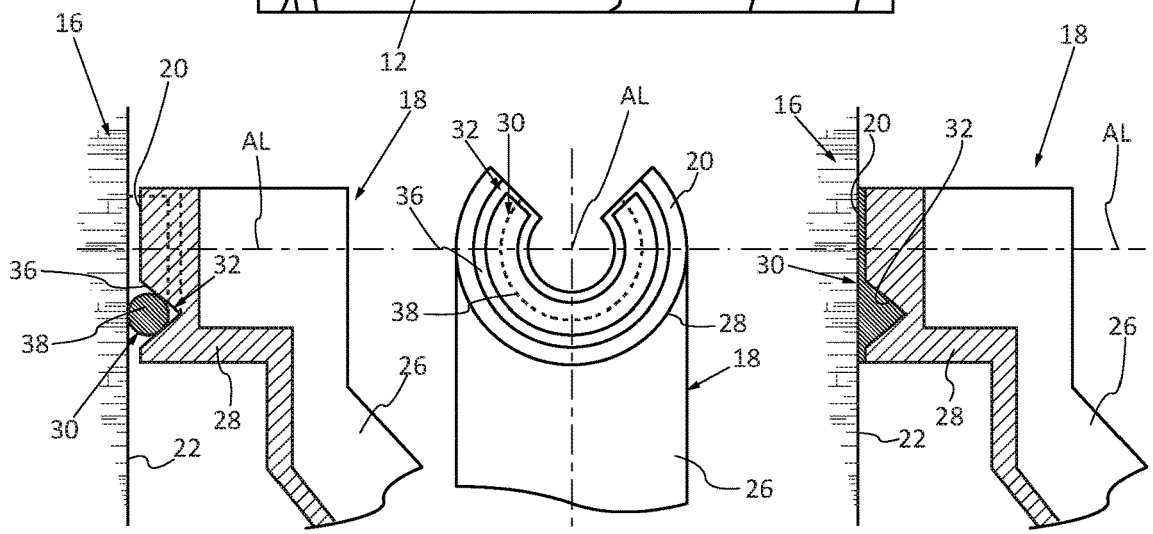
FIG. 3 is a longitudinal section through a support leg illustrating one embodiment of the invention prior to deformation of an interface.
FIG. 4 is a front view of the support leg of FIG. 3.
FIG. 5 is a longitudinal section through the support leg visible in FIG. 3 after deformation.

According to one embodiment visible in FIGS. 3 to 5, the recess 32 is a groove 36 with a V-shaped cross section and the interface 30 is a wire 38 made of a ductile material with a circular cross section.

The groove 36 may be straight, curved or comprise a succession of curved and/or straight portions.

As illustrated in FIGS. 3 to 5, the contact surface 20 is a ring portion centered with respect to the axis of the tool and extending over an angular sector of the order of 270°. According to this embodiment, the groove 36 has a profile in the shape of an arc of a circle centered with respect to the axis of the tool and extends over the entire ring portion. To complement this, the wire 38 made of ductile material extends over almost the entire length of the groove 36 and has a diameter greater than the depth of the groove 36.

Figure 6:
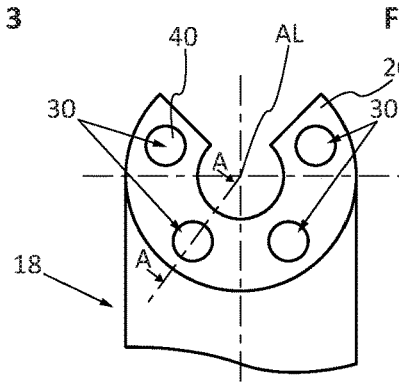
FIG. 6 is a front view of a support leg illustrating another embodiment of the invention.
Figure 7:
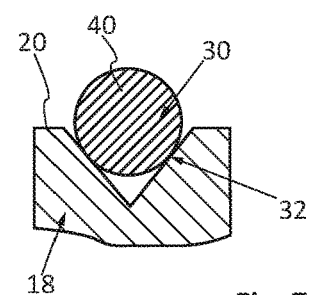
FIG. 7 is a longitudinal section on A-A of part of the support leg visible in FIG. 6.

According to another embodiment visible in FIGS. 6 and 7, the recess 32 has a circular cross section in a transverse plane perpendicular to the axis of the tool, such as, for example, a conical shape. To complement this, the interface 30 is a ball 40 made of ductile material.

According to other embodiments, the contact surface 20 may comprise several recesses 32 with different shapes, each recess 32 comprising at least one interface 30 made of a ductile material.

In operation, the support leg 18 is pressed against the workpiece 16. Each interface 30 made of a ductile material is compressed, in the recess 32, between the face 22 of the workpiece 16 and the contact surface 20 of the support leg 18. During this compression, each interface 30 deforms to conform to the shapes of the recess 32, creeping around the recess between the face 22 of the workpiece 16 and the contact surface 20 of the support leg 18. After compression, the interface 30 perfectly conforms to the shapes of the recess and becomes immobile with respect to the support leg 18. The creep notably has the effect of increasing the area of contact between the interface 30 and the face 22 of the workpiece 16.

A ductile material has an elastic modulus markedly greater than that of an elastomer. By way of indication, tin has an elastic modulus of the order of 41 GPa whereas rubber has an elastic modulus of the order of 0.1 GPa. This property makes it possible to ensure rigidity between the support leg 18 and the workpiece 16, the support leg 18 remaining immobile with respect to the workpiece 16 along the longitudinal axis AL and in the two directions orthogonal to the longitudinal axis AL.

The interface 30 made of ductile material will, during compression and creep, conform to all the slightest irregularities of the face 22 of the workpiece 16. This property makes it possible to obtain an excellent adhesion coefficient of the order of 0.5, even when lubricant is present, and therefore to limit the risks of tool slippage and workpiece damage.

Finally, the use of a ductile material as an interface makes it possible to ensure the integrity of the workpiece 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An effector supporting at least one tool configured to perform an operation on a workpiece and comprising at least one contact surface configured to bear against a face of the workpiece adjacent a zone of the workpiece that is impacted by the at least one tool, said at least one contact surface comprising at least one ball interposed between said at least one contact surface and the face of the workpiece, wherein the at least one ball is made of a ductile material,
   wherein, in a first operational state, the at least one ball is positioned between a first predetermined portion of the at least one contact surface and the face of the workpiece, the first predetermined portion configured not to contact the face of the workpiece, and
   wherein, in a second operational state, the at least one ball is sandwiched between at least a second predetermined portion of the at least one contact surface, distinct from and adjacent to the first predetermined portion, and the face of the workpiece, the second predetermined portion configured to contact the face of the workpiece in absence of the at least one ball,
   wherein the first predetermined portion of the at least one contact surface comprises at least one recess configured to partially house the at least one ball,
   wherein in the first operational state, the at least one ball is configured to creep out of the at least one recess,
   wherein the at least one recess has a circular cross section in a plane perpendicular to the axis of the at least one tool.

2. The effector as claimed in claim 1, wherein the material of the at least one ball has an elastic modulus higher than 5 GPa.

3. The effector as claimed in claim 1, wherein the at least one ball has a volume greater than the volume of the at least one recess configured to house said at least one ball.

4. The effector as claimed in claim 1, wherein the at least one recess is a groove of V-shaped cross section.

5. The effector as claimed in claim 4, wherein the groove has a profile shaped in an arc of a circle centered with respect to an axis of the at least one tool.

* * * * *